United States Patent
Engel et al.

(10) Patent No.: US 11,165,664 B2
(45) Date of Patent: Nov. 2, 2021

(54) ENFORCING ELECTRONIC SERVICE CONTRACTS BETWEEN COMPU'IING DEVICES

(71) Applicant: International Business Machines Corporation, Armonk, NY (US)

(72) Inventors: Robert M. Engel, San Francisco, CA (US); Shashank Rajamoni, San Jose, CA (US); Bryant R. Chen, Berkeley, CA (US); Heiko H. Ludwig, San Francisco, CA (US); Alexander Keller, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/541,648

(22) Filed: Aug. 15, 2019

(65) Prior Publication Data
US 2021/0051080 A1   Feb. 18, 2021

(51) Int. Cl.
*H04L 12/24*    (2006.01)

(52) U.S. Cl.
CPC ...... *H04L 41/5006* (2013.01); *H04L 41/0843* (2013.01); *H04L 41/5019* (2013.01); *H04L 41/5032* (2013.01)

(58) Field of Classification Search
None
See application file for complete search history.

(56) References Cited

U.S. PATENT DOCUMENTS

| 7,062,472 B2 | 6/2006 | Dan et al. |
| 2010/0257007 A1 | 10/2010 | Chan et al. |
| 2014/0310434 A1* | 10/2014 | Strange ............... H04L 41/5009 710/16 |
| 2015/0180736 A1* | 6/2015 | Leung ................. H04L 41/5054 709/226 |
| 2019/0052549 A1* | 2/2019 | Duggal .................. G06Q 30/04 |

OTHER PUBLICATIONS

Jaafar et al. "AI for SLA Management in Programmable Network", Mar. 2017 (Year: 2017).*
Samir et al. "rSLA: A service level agreement language for cloud services", 2016, IEEE computer society. (Year: 2016).*

(Continued)

*Primary Examiner* — Aaron N Strange
*Assistant Examiner* — Mohammad Yousuf A. Mian
(74) *Attorney, Agent, or Firm* — Anthony Curro; Edell, Shapiro & Finnan, LLC (57) ABSTRACT

A method, computer system, and computer program product are provided. A set of classifiers are applied to metric definitions of an electronic contract between computing devices of a service provider and a service consumer. Each classifier includes a selector pattern and a set of variable declarations. Performance data of the service provider computing device are filtered according to the selector pattern of the each classifier. One or more algebraic expressions of the metric definitions are evaluated in accordance with the each classifier and the filtered performance data to determine compliance of the service provider computing device with the electronic contract. Evaluation results indicating whether the service provider computing device is in compliance with the electronic contract are captured and reported.

18 Claims, 8 Drawing Sheets

(56) References Cited

OTHER PUBLICATIONS

Luo et al. "SLA Foundation Template Library: Reusable-Component Repository for SLA", IEEE (Year: 2003).*

Engel, et al., "Ysla: Reusable and Configurable SLAs for Large-Scale SLA Management", 2018 IEEE 4th International Conference on Collaboration and Internet Computing, Oct. 18-20, 2018, Philadelphia, PA, 9 pages. (Grace Period Disclosure).

Rafique et al., "SCOPE: Self-Adaptive and Policy-Based Data Management Middleware for Federated Clouds", Journal of Internet Services and Applications, Jan. 30, 2019.

Ludwig et al., "rSLA: Monitoring SLAs in Dynamic Service Environments", International Conference on Service Oriented Computing, Nov. 25, 2015, p. 139-153.

Spillner et al., "Dynamic SLA Template Adjustments Based On Service Propoerty Monitoring", IEEE International Conference on Cloud Computing, 2009, IEEE (2009).

Andrieux et al., "Web Services Agreement Specification (WS-Agreement) Version 2005/09", Grid Resource Allocation Agreement Protocol (GRAAP) WG, Global Grid Forum (2005).

Lamanna et al., "SLAng" A Language For Defining Service Level Agreements, 9th IEEE Workshop on Future Trends of Distributed Computing Systems, IEEE Computer Society (2003).

Tebbani et al., "GXLA: A Language for the Specifcation of Service Level Agreements", in Automatic Networking, Lecture Notes in Computer Science, vol. 4195, pp. 201-214, Springer Berlin Heidelberg (2006).

* cited by examiner

SLA DOCUMENT FOR CLIENT1

Client1SLA: !ysla.SLA
   effectiveDate: yyyy-mm-dd 10:00:00
   description: Sample SLA document for Client1

BASE_URL: "client1-icd.internal.net" ⎬ 302

ClassAB-Tasks: !ysla.Scope
   include: "sla_class=\"(A|B)\""
   constants:
      MAX_EXECUTION_TIME: 60 # seconds ⎬ 304

ClassCD-Tasks: !ysla.Scope
   include: "sla_class=\"(C|D)\""
   constants:
      MAX_EXECUTION_TIME: 3600 # seconds ⎬ 306

TaskExecutionTime: !ysla.SLO
   metric: IsExecutionTimeWithinLimitsForPercentile
   scopes:
      - ClassAB-Tasks
      - ClassCD-Tasks
   constants:
      MINIMUM_FAST_INSTANCES_PCT: .95
   schedule: monthly ⎬ 308

Tasks: !ysla.Monitor
   forSLO: TaskExecutionTime
   metrics: [FastInstances, SlowInstances]
   schedules: [monthly, weekly]
   groupBy: [location, resource, offering] ⎬ 310

FIG.3

REUSABLE CROSS-CLIENT TEMPLATE

ExecutionTime: !ysla.Metric
  url: $BASE_URL/execution_times
  schedule: every_minute
  ⎬ 402

FastInstances: !ysla.Metric
  expression: "size(ExecutionTime[<=$MAX_EXECUTION_TIME])"
  precondition: "size(ExecutionTime)>0"
  ⎬ 404

SlowInstances: !ysla.Metric
  expression: "size(ExecutionTime[>$MAX_EXECUTION_TIME])"
  precondition: "size(ExecutionTime)>0"
  ⎬ 406

IsExecutionTimeWithinLimitsForPercentile: !ysla.Metric
  expression: >
  (FastInstances / (FastInstances + SlowInstances))
  > $MINIMUM_FAST_INSTANCES_PCT
  precondition: "size(FastInstances)>0"
  ⎬ 408

FIG.4

```
CLIENT SLA FOR SERVICE REQUESTS sample_sla: !ysla.SLA
    effective: YYYY-MM-DD 00:00:00
    description: SLA for Client1                    } 502
    templates: [ServiceRequests]
    status: ACTIVE BASE_URL: "client1-siam-data.monitoring.domain"    } 504

CategoryA: !ysla.Scope
    include: "\"category\":\"A\""
    constants:                                      } 506
        BASE_MAX_DURATION: 1800 # 30 min CategoryB: !ysla.Scope
    include: "\"category\":\"B\""
    constants:                                      } 508
    BASE_MAX_DURATION: 7200 # 2 hours Offering_SLO: !ysla.SLO
    metric:    SR_FAST_within_percentile
    constants:
        MINIMUM_FAST_INSTANCES_PCT: .9              } 510
        MAX_DURATION: $BASE_MAX_DURATION
    scopes:   [CategoryA, CategoryB]

Offering_SLO2X: !ysla.SLO
    metric:    SR_FAST_within_percentile
    constants:
        MINIMUM_FAST_INSTANCES_PCT: .95             } 512
        MAX_DURATION: 2*$BASE_MAX_DURATION
    scopes:   [CategoryA, CategoryB]

Offering_SLOs: !ysla.Monitor
    forSLOs: [Offering_SLO, Offering_SLO2X]
    schedules: [ every_week, every_month ]
    metrics: [SR_FAST, SR_SLOW,                     } 514
        SR_FAST_within_percentile]
    groupBy: [offering_id, site, $_SLO]
```

FIG.5

TEMPLATE FOR SERVICE REQUESTS

ServiceRequests: !ysla.Template  
  description: Service Request duration metrics   } 602

SRDuration: !ysla.Metric  
  url: $BASE_URL/SRDuration  
  schedule: every_second   } 604

SR_FAST: !ysla.Metric  
  expression: > size(SRDuration[<=$MAX_DURATION])   } 606

SR_SLOW: !ysla.Metric  
  expression: > size(SRDuration[>$MAX_DURATION])   } 608

SR_FAST_within_percentile: !ysla.Metric  
  expression: > (SR_FAST/(SR_FAST+SR_SLOW)) >  
    $MINIMUM_FAST_INSTANCES_PCT  
  precondition: (SR_FAST+SR_SLOW) > 0   } 610

ENFORCING ELECTRONIC SERVICE CONTRACTS BETWEEN COMPU'IING DEVICES

STATEMENT REGARDING PRIOR DISCLOSURE BY THE INVENTOR OR A JOINT INVENTOR

The following disclosure is submitted under 35 U.S.C. 102(b)(1)(A): DISCLOSURE: "ysla: Reusable and Configurable SLAs for Large-Scale SLA Management" by Robert Engel, Shashank Rajamoni, Bryant Chen, Heiko Ludwig, and Alexander Keller, made publicly available at the 2018 IEEE $4^{th}$ International Conference on Collaboration and Internet Computing, Oct. 18-20, 2018, 9 pages.

BACKGROUND

1. Technical Field

Present invention embodiments relate to monitoring computing devices for enforcement of electronic service agreements. In particular, the present invention embodiments relate to electronically specifying Service Level Agreements (SLAs) and enforcing the electronically specified SLAs by monitoring performance metrics and by reporting monitoring results and/or taking corrective action.

2. Discussion of the Related Art

A Service Level Agreement (SLA) is an agreement between a service provider, such as an Information Technology (IT) service provider and/or a cloud service provider, and a service consumer. The SLA specifies requirements and expectations regarding the services to be provided by the service provider to the service consumer.

Typically, SLAs are negotiated and specified in service contracts using natural language. Various formalisms for modeling SLAs as electronic contracts between a number of parties and SLA management frameworks using such formalisms may be employed. Various existing systems enforce electronic contracts for SLA management by, for example, monitoring performance metrics defined in the electronic contracts and reporting the results, or taking appropriate automated actions under previously defined conditions.

SLAs between various service providers and service consumers (e.g., clients) may share commonalities, which may include general semantics of commonly used performance metrics and Service Level Objectives (SLOs). Some existing SLA management approaches use SLA templates as building blocks for engagement-specific SLAs. As a result, predefined elements, such as definitions of performance metrics relevant to certain SLA management domains may be reused in new business engagements. However, in addition to differences in agreed service levels, performance metric definitions across business engagements often differ in various details. Although many metric definitions in SLAs between service providers and clients may share basic algebraic rules for computation, the rules may be applied in a context of different classification or categorization taxonomies of monitored metrics for specific business engagements.

Example domains that depend on common metric definitions combined with engagement-specific classification categorization taxonomies may include, but not be limited to: SLAs for service request handling as part of Information Technology (IT) services delivery with different predefined categories for maximal completion times; SLAs for performance monitoring of a stack of micro services with different groups of responsibilities; and SLAs for specificity/sensitivity targets of different medical image classifier services.

While general semantics and computation rules for metrics, such as "maximal duration to resolve an incident", may be identical for all clients, various clients may define severity of incidents (i.e., incident classes) differently in individual SLAs. Predefined metric definitions for "maximal duration to resolve an incident" in prepared SLA templates may not be easily adaptable for different classes of incidents without repetitive specification of monitoring constructs in SLA documents based on such templates (e.g., specifying multiple SLO's for individual incident classes as a possible workaround).

SUMMARY

According to one embodiment of the present invention, a computer-implemented method for enforcing electronic contracts between computing devices is provided. A computer applies a set of classifiers to metric definitions of an electronic contract between computing devices of a service provider and a service consumer. Each classifier includes a selector pattern and a set of variable declarations. The computer filters performance data of the service provider computing device according to the selector pattern of the each classifier. One or more algebraic expressions of the metric definitions are evaluated by the computer in accordance with the each classifier and the filtered performance data to determine compliance of the service provider computing device with the electronic contract. Evaluation results indicating whether the service provider computing device is in compliance with the electronic contract are captured and reported by the computer.

According to a second embodiment of the present invention, a computer system for enforcing electronic contracts between computing devices is provided. The computer system includes at least one computing device, each of which includes at least one processor and at least one memory connected to the at least one processor. The at least one processor is configured to apply a set of classifiers to metric definitions of an electronic contract between computing devices of a service provider and a service consumer. Each classifier includes a selector pattern and a set of variable declarations. Performance data of the service provider computing device are filtered according to the selector pattern of the each classifier. One or more algebraic expressions of the metric definitions are evaluated in accordance with the each classifier and the filtered performance data to determine compliance of the service provider computing device with the electronic contract. Evaluation results indicating whether the service provider computing device is in compliance with the electronic contract are captured and reported.

According to a third embodiment of the present invention, a computer program product is provided for enforcing electronic contracts between computing devices. The computer program product includes at least one computer readable storage medium having computer readable program code embodied therewith for execution on at least one processor of a computer system. The computer readable program code is configured to be executed by the at least one processor to apply a set of classifiers to metric definitions of an electronic contract between a service provider and a service consumer. Each classifier includes a selector pattern and a set of variable declarations. Performance data of the service provider computing device are filtered according to the selector pattern of the each classifier. One or more algebraic expressions of the metric definitions are evaluated in accordance with the each classifier and the filtered performance data to determine compliance of the service provider computing device with the electronic contract. Evaluation results indicating whether the service provider computing device is in compliance with the electronic contract are captured and reported.

BRIEF DESCRIPTION OF THE DRAWINGS

Generally, like reference numerals in the various Figs. are utilized to designate like components.

DETAILED DESCRIPTION

In various embodiments, a semantic construct (Scope) is introduced into formal specifications for electronic contracts. The semantic construct provides for defining of classifiers for observational data, which may be based on meta-attributes or contextual attributes of the data, and assignment of specific values to variables for use at runtime for the defined classifiers in order to evaluate algebraic expressions based on metric definitions in predefined templates. The semantic construct may define inclusive and/or exclusive selector attributes that are applied at expression evaluation time to filter the observational data upon which the expression operates such that only observation data that matches a selector pattern is included and/or excluded, respectively, based on the expression evaluation at runtime. Further, variables may be defined in a particular semantic construct such that the variables are used when evaluating expressions within that particular construct. The semantic construct may be applied to any type of monitoring construct in electronic contracts. For example, the semantic construct may be applied to Service Level Objective (SLO) definitions, which may be based on metric definitions predefined in templates. The semantic construct may evaluate monitoring constructs such that evaluation of each monitoring construct may produce a corresponding vector of results.

YAML (YAML Ain't Markup Language) is a human-readable data-serialization language that is commonly used for configuration files, but could be used in many applications in which data is being stored or transmitted. In one embodiment, ysla, a language based on YAML, may be used to specify SLAs. ysla uses templates and scopes, which are constructs for reusable SLA building blocks and classification/categorization of observation data to better align formal SLA specifications with real-world business needs and to improve conciseness of SLA specifications as compared with existing formalisms.

Figure 1:
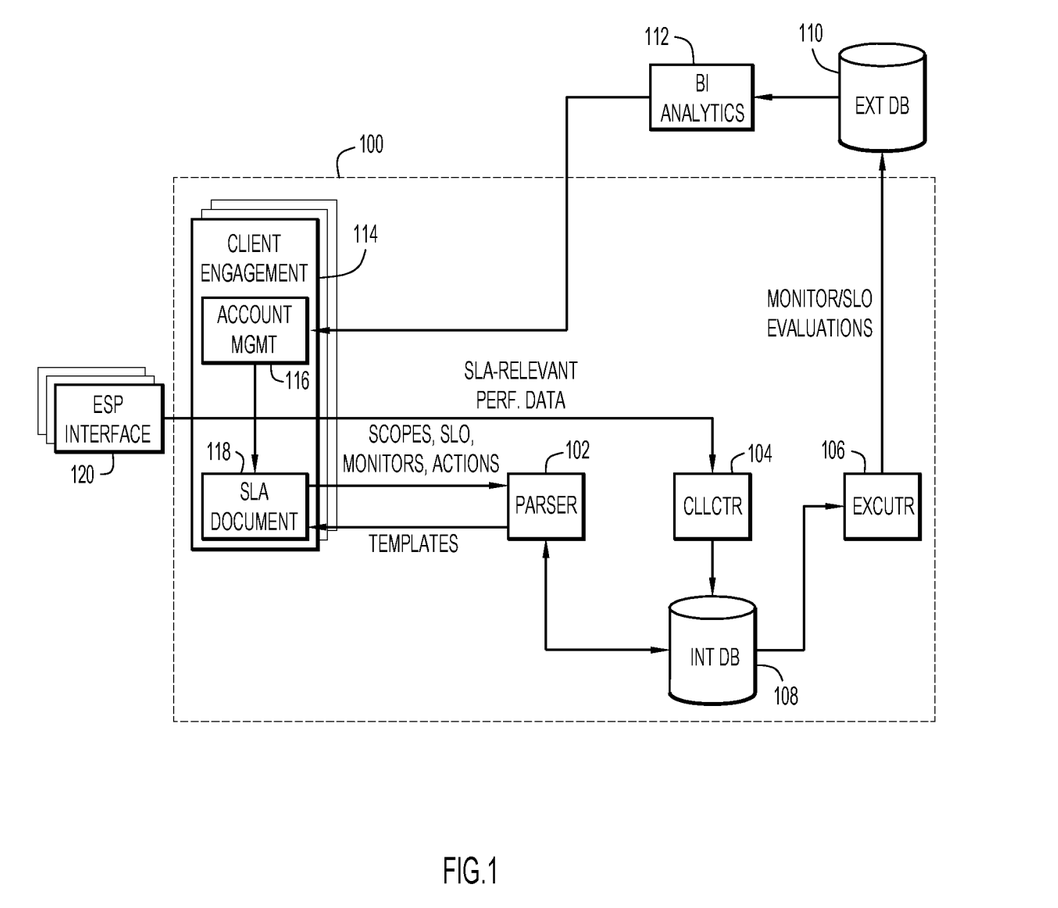
FIG. 1 illustrates an example electronic contract engine that may be implemented according to various embodiments.

FIG. 1 is a functional block diagram of an example electronic contract engine 100 in an embodiment. Engine 100 may include services such as a collector 104, an executor 106, and a parser 102.

Collector 104 collects observations according to metrics and corresponding schedules specified or referred to in active SLA documents. Collector 104 may persist collected observations in an internal database 108. In some embodiments, internal database 108 may employ relational database systems with NoSQL features for semi-structured data.

Executor 106 evaluates SLO's and monitors metrics according to schedules specified in active ysla documents. In addition, executor 106 is responsible for evaluating expressions. In some embodiments, regular expression matching capabilities of modern relational database systems are exploited for observation data filtering on a level of SQL queries.

In some embodiments, multiple instances of executor 106 may share a workload of evaluations and may coordinate jobs through a messaging service. Evaluations for monitored metrics and SLO's may be persisted in an external database 110, which may be accessible to a business intelligence (BI) analytics tool 112 such as, for example, IBM Cognos Analytics, which is available from International Business Machines of Armonk, N.Y., or other business intelligence analytics tools.

Parser 102 is responsible for parsing ysla documents and relating them to predefined templates, which may be stored in internal database 108.

Electronic contract engine 100 may have multiple client engagements 114. Each client engagement 114 may include account management 116, which is responsible for reviewing results produced by BI analytics 112 and for producing an electronic contract including, but not limited to, a SLA document 118. One or more external service providers may provide one or more external service provider (ESP) interfaces 120 to provide SLA-relevant performance data to electronic contract engine 100, where collector 104 may persist the SLA-relevant performance data (e.g., raw observation data) to internal database 108.

Embodiments of electronic contract engine 100 may be executed on one or more computing devices, which may be connected via a network. The network may include a local area network, a wide area network, the Internet, or any combination thereof.

Figure 2:
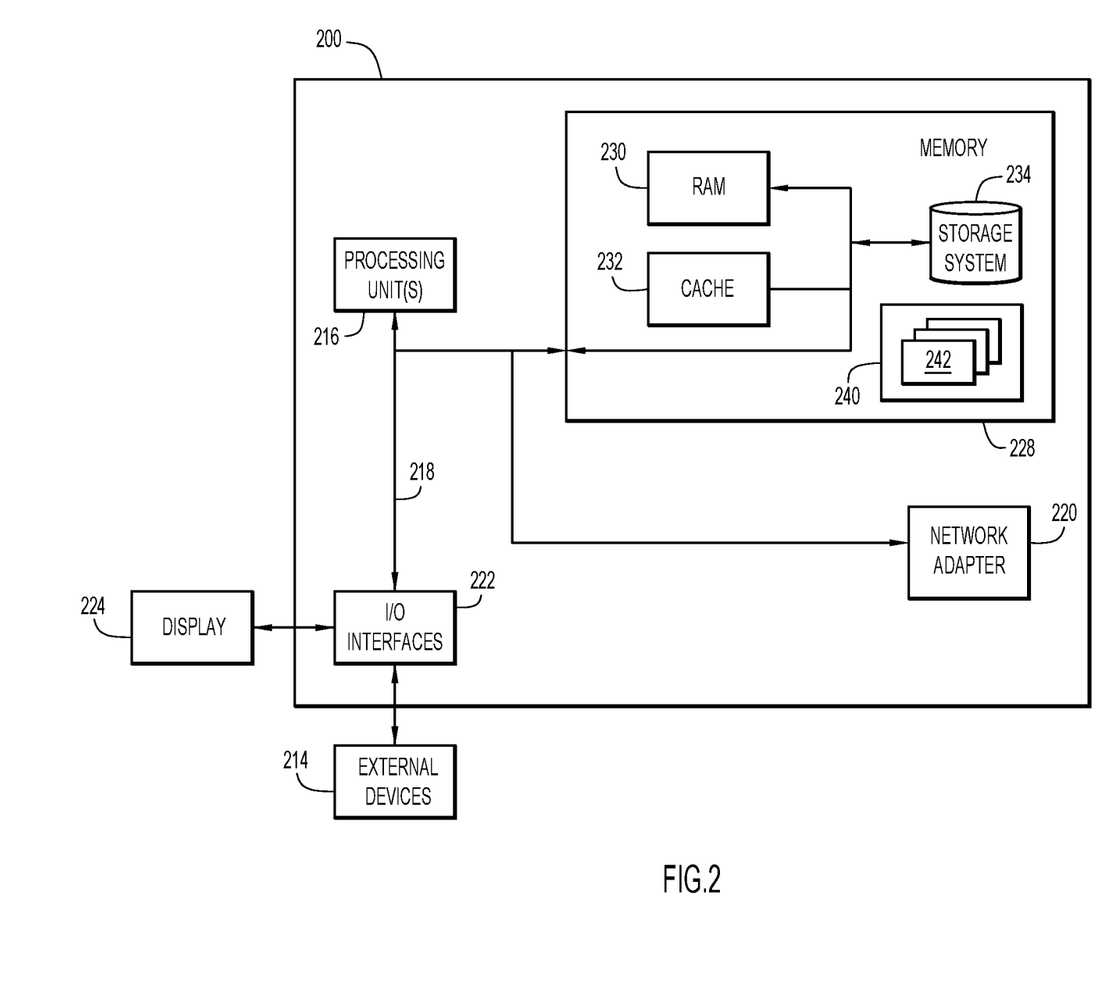
FIG. 2 is functional block diagram of an example computer system on which embodiments may be implemented.

FIG. 2 is a functional block diagram of a computer system 200 that may implement electronic contract engine 100 either alone or in combination with other computing systems. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
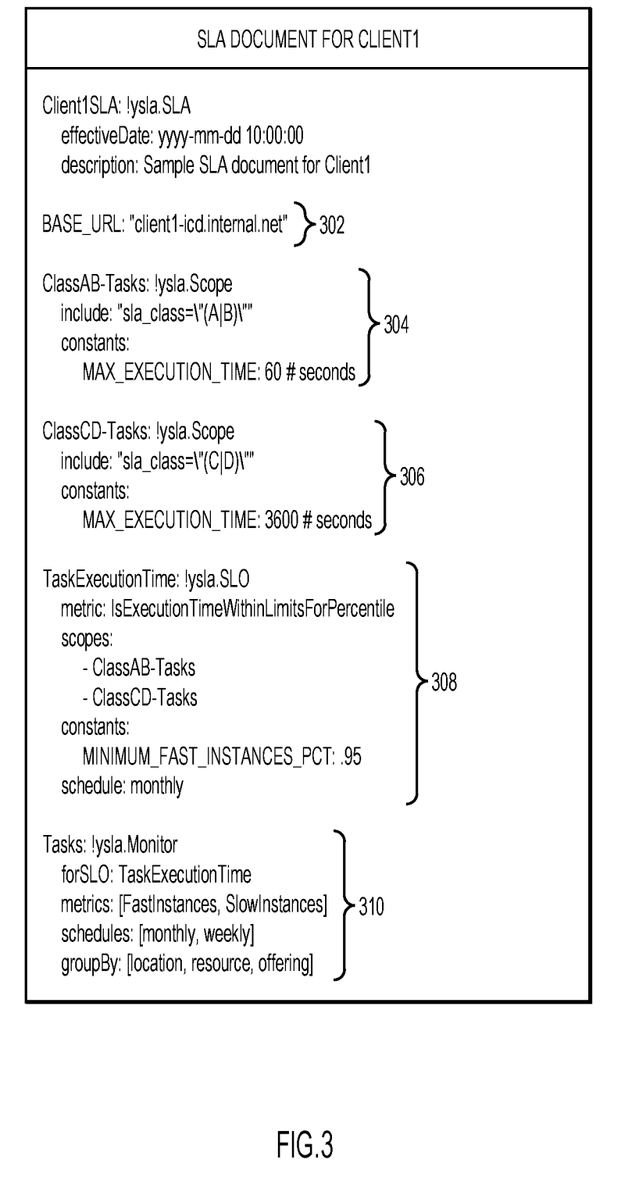
FIG. 3 shows an example service level agreement document according to various embodiments.
Figure 4:
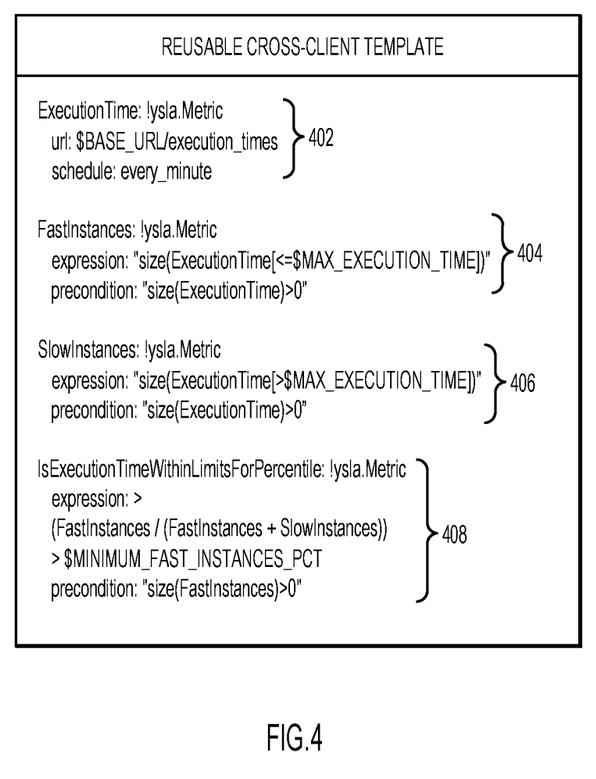
FIG. 4 is an example predefined reusable template that may be used with the service level agreement document of FIG. 3 according to various embodiments.

FIG. 3 illustrates an example SLA document for a client, client1, and FIG. 4 shows a corresponding template defining metrics for use at task execution time. The example SLA document and the corresponding template are written in the ysla language. However, in other embodiments, a different language may be used.

The SLA document of FIG. 3 is written to determine whether a service provider complies with an SLA in which 95% of class A and B tasks are to be completed in 60 seconds, and 95% of class C and D tasks must be completed in 3600 seconds. At 302, a variable called BASE_URL is defined to have a constant value of "client1-icd.internal.net" throughout the SLA document. A first scope 304 called ClassAB-Tasks is defined to include selector patterns or classifiers A and B, and a variable called MAX_EXECUTION_TIME is defined to have a constant value of 60 seconds for scope 304. Although the statement "include: "sla_class=\"(A|B)\""" indicates inclusion of classifiers or classes A and B, a statement such as "exclude: "sla_class=\"(C|D)\""" would explicitly indicate that classifiers or classes C and D are excluded from scope 304. A second scope 306 called CLASSCD-Tasks is defined to include classifiers or classes C and D, and the variable called MAX_EXECUTION_TIME is defined to have a constant value of 3600 seconds for scope 306.

A SLO 308 called TaskExecutionTime is defined with reference to a metric called IsExecutionTimeWithinLimitsForPercentile, which is defined in the example template of FIG. 4. SLO 308 is defined for scopes 304 and 306. A variable, MINIMUM_FAST-INSTANCES_PCT, is defined to have a constant value of 0.95 for classifiers or classes A, B, C and D. In FIG. 3, SLO 308 is defined to be evaluated on a monthly schedule.

A monitor 310 called Tasks is defined for SLO 308 for monitoring metrics FastInstances and SlowInstances according to monthly and weekly schedules. Metrics FastInstances and SlowInstances are defined in a predefined template of FIG. 4. Monitor 310 is defined to record a time series of underlying metrics (FastInstances and SlowInstances) in detail and broken down by location, resource and service offerings as categorized by selector patterns or classifiers (classes) A, B, C and D. Executor 106 may evaluate monitored performance data and may store a time series of the monitored data in external database 110.

FIG. 4 illustrates an example of a reusable cross-client template that may be used with the SLA document defined in FIG. 3. Collector 104 may collect, or receive, the performance data and may persist the monitored performance data in internal database 108. The template defines a first metric 402 called ExecutionTime, which defines a URL from which performance data, such as execution times in this example, may be accessed every minute. The URL, in this example, is defined based on the variable Base_URL defined in the SLA document of FIG. 3. Thus, executor 106 of electronic contract engine 100 may evaluate a value of the URL to be a constant of value "client1-icd.internal.net/execution_times" and may evaluate execution times from URL "client1-icd.internal.net/execution_times", which may be persisted in internal database 108.

A second metric 404, called FastInstances, is defined to have a precondition requiring a number of collected execution times for evaluation to be greater than zero. If the number of collected execution times is greater than zero, then FastInstances is set to a number of execution times that are less than a value of the variable MAX_EXECUTION_TIME, which has a value of 60 seconds for classes A and B, and a value of 3600 seconds for classes C and D, as defined by scopes 304 and 306.

A third metric 406, called SlowInstances, is defined to have a precondition requiring a number of collected execution times for evaluation to be greater than zero. If the number of collected execution times is greater than zero, then SlowInstances is set to a number of execution times that are greater than a value of the variable MAX_EXECUTION_TIME, which has a value of 60 seconds for classes A and B, and a value of 3600 seconds for classes C and D.

A fourth metric 408, called IsExecutionTimeWithinLimitsForPercentile, is defined to have a precondition requiring a number of execution times that correspond to FastInstances to be greater than zero. If this precondition is satisfied, then fourth metric 408, including the expression (FastInstances/(FastInstances+SlowInstances))>$MINIMUM_FAST_INSTANCES_PCT, is evaluated and the corresponding value of (FastInstances/(FastInstances+SlowInstances)), which is a percentage of all execution times that are less than or equal to MAX_EXECUTION_TIME, is compared to a value of $MINIMUM_FAST_INSTANCES_PCT and a Boolean value of true or false is assigned to metric 408, IsExecutionTimeWithinLimitsForPercentile, based on whether the corresponding value of (FastInstances/(FastInstances+SlowInstances)) is greater than $MINIMUM_FAST_INSTANCES_PCT or not greater than MINIMUM_FAST_INSTANCES_PCT, respectively.

Because, in this example, the variable MAX_EXECUTION_TIME has a value of 60 seconds for classes A and B, and 3600 seconds for classes C and D, the metrics FastInstances and SlowInstances will be evaluated differently depending on a selector pattern, or classification, to which an execution time belongs. For example, for execution times belonging to classes A or B, FastInstances would be evaluated to be a number of execution times that are less than or equal to 60 seconds, and SlowInstances would be evaluated to be a number of execution times that are greater than 60 seconds. Similarly, for execution times belonging to classes C or D, FastInstances would be evaluated to be a number of execution times that are less than or equal to 3600 seconds, and SlowInstances would be evaluated to be a number of execution times that are greater than 3600 seconds. As a result, the metric IsExecutionTimeWithinLimitsForPercentile would be evaluated as being true when a number of execution times that are less than or equal to 60 seconds divided by a number of all execution times is greater than 0.95 for execution times classified as being in either class A or class B. For execution times classified as being in either class C or class D, IsExecutionTimeWithinLimitsForPercentile would be evaluated as being true when a number of execution times in class C or class D that are less than or equal to 3600 seconds divided by a number of all execution times is greater than 0.95.

Figure 5:
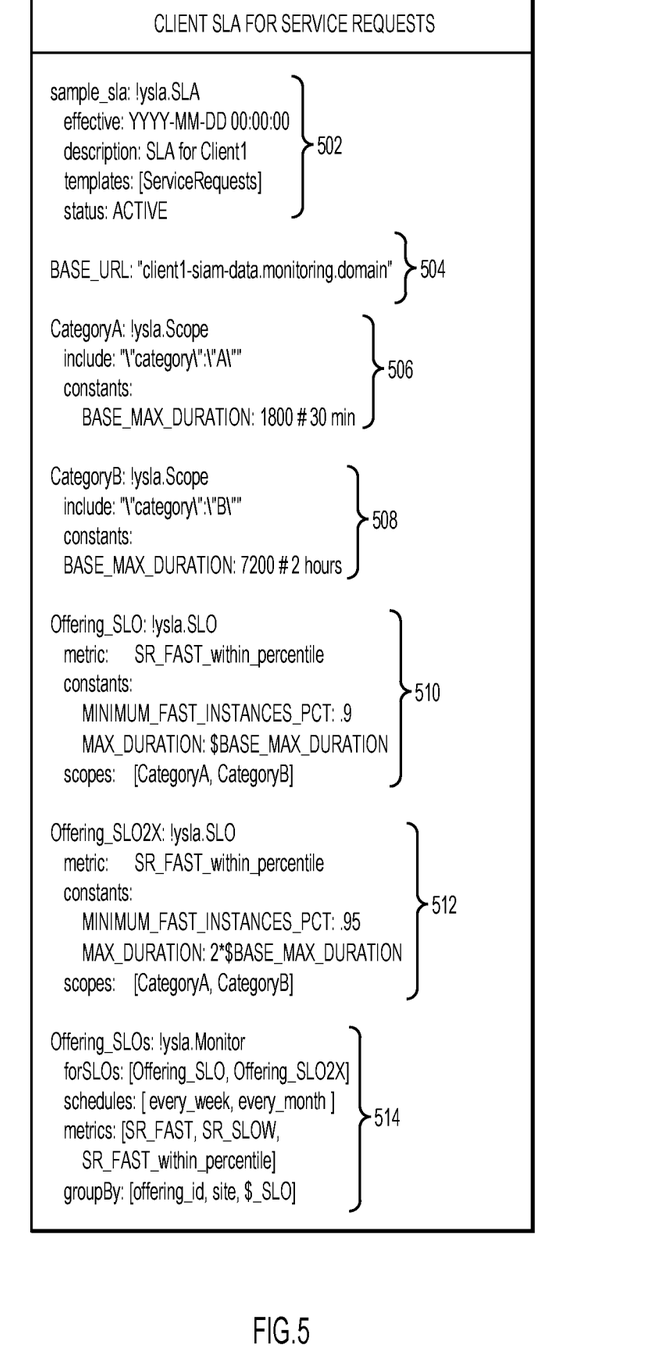
FIG. 5 is a second example service level agreement document for service requests according to various embodiments.
Figure 6:
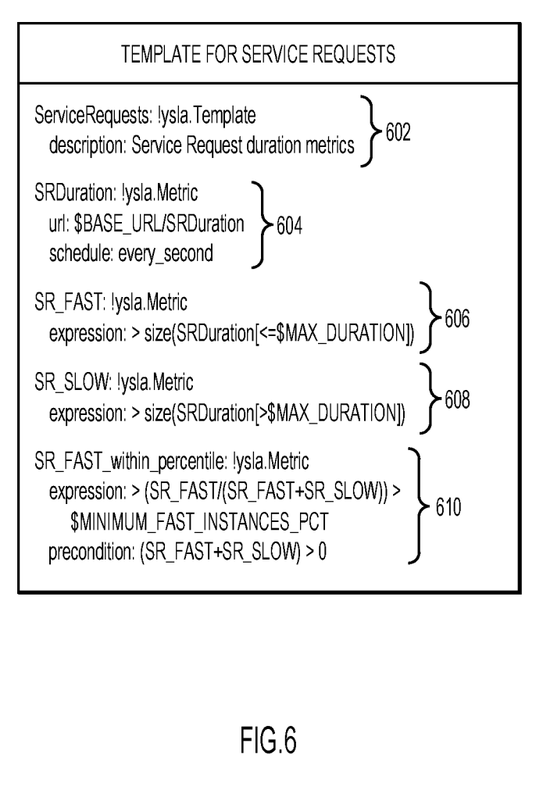
FIG. 6 shows a second example predefined reusable template that may be used with the second example service level agreement document of FIG. 5 according to various embodiments.

FIGS. 5 and 6, respectively, show an example client SLA for service requests and an example predefined template for use with the example SLA for evaluating service requests, both of which are written in the ysla language, but could have been written in another language in another embodiment. In this example, class A service requests have a maximum duration of 30 minutes and class B service requests have a maximum duration of 2 hours. A SLO for this example requires 90% of the service requests to be resolved within the maximum duration and 95% to be resolved within twice the maximum duration.

With reference to FIG. 5, at 502, the client SLA is named sample_SLA, uses a predefined template named ServiceRequests, and is declared to have an active status. At 504, a variable called BASE_URL is declared to have a constant value of "client1-siam-data.monitoring.domain". At 506, a first scope called CategoryA is defined to include service requests in category A, and a variable called BASE_ MAX_DURATION is declared to have a constant value of 1800 seconds, which is 30 minutes. At 508, a second scope called CategoryB is defined to include service requests in category B, and the variable called BASE_MAX_DURATION is declared to have a constant value of 7200 seconds, which is 2 hours.

At 510, a SLO called Offering_SLO is declared for category A and category B service requests and includes a metric called SR_FAST_within_percentile and two variables named MINIMUM_FAST_INSTANCES_PCT, which has a constant value of 0.9, and MAX_DURATION, which has a constant value of 1800 seconds for category A service requests and a value of 7200 seconds for category B service requests.

At 512, a SLO called Offering_SLO2X is declared for category A and category B service requests and includes a metric called SR_FAST_within_percentile and two variables named MINIMUM_FAST_INSTANCES_PCT, which has a value of 0.95, and MAX_DURATION, which has a value of 3600 seconds (1 hour) for category A service requests and a value of 14400 seconds (4 hours) for category B service requests.

At 514, a monitor called Offering_SLOs is declared for SLOs Offering_SLO and Offering_SLO2X and is scheduled to collect performance data on a weekly and monthly basis. By referencing the two SLOs in a for SLOs attribute, the monitor will be evaluated for each of the SLOs and all corresponding scopes. The monitor uses metrics SR_FAST, SR_SLOW, and SR_FAST within_percentile, which are defined to be evaluated as respective expressions in the predefined template of FIG. 6. In this example, because all evaluations are persisted in a single time series table, Offering_SLOs results are grouped by SLO name as indicated by using a variable, $_SLO in the groupBy attribute.

FIG. 6 shows the example predefined template for use with the SLA document of FIG. 5. At 602, the template is named ServiceRequests. At 604, a metric called SRDuration is declared and is scheduled to be monitored every second. A URL is declared using the value of the constant BASE_URL, defined at 504 of FIG. 5, concatenated to a string "/SRDuration" such that the URL is evaluated to have a value of "client1-siam-data.monitoring.domain/SRDuration". Thus, performance data including duration values may be collected and persisted to internal database 108 by collector 104 each second.

At 606, a number of collected durations having values less than or equal to a value assigned to the variable MAX_DURATION is assigned to metric SR_FAST. Because the variable MAX_DURATION at SLOs 510 and 512 for scopes of category A and category B has different values, the metric SR_Fast, in this example, is evaluated to have a value equal to a number of collected SRDuration values that are less than or equal to 1800 seconds for category A durations and a value equal to a number of collected SRDuration values that are less than or equal to 7200 seconds for category B durations.

Similar to the metric SR_Fast, at 606, a number of collected durations having values greater than the value of the variable MAX_DURATION is assigned to metric SR_SLOW. Because the variable MAX_DURATION at SLOs 510 and 512 for scope 506 for the category A and scope 508 for the category B have different values, the metric SR_Slow, in this example, is evaluated to have a value equal to a number of collected SRDuration values that are greater than 1800 seconds for category A durations and a value equal to a number of collected SRDuration values that are greater than 7200 seconds for category B durations.

At 610, a value of true is assigned to metric SR_Fast_within_percentile when (SR_Fast/(SR_Fast+SR_Slow)) evaluates to a value that is greater than the variable MINIMUM_FAST_INSTANCES_PCT, which is defined at 510 of FIG. 5 to have a value of 0.9 for evaluating category A and B durations for the SLO named Offering_SLO and a value of 0.95 for evaluating category A and B durations for the SLO named Offering_SLO2X. Otherwise, if SR_Fast_within_percentile is not assigned a value of true, then it is assigned a value of false. Note that, in this example, a precondition for evaluating the metric SR_Fast_within_percentile is that a sum of the values of SR_Fast and SR_Slow be greater than 0.

Figure 7:
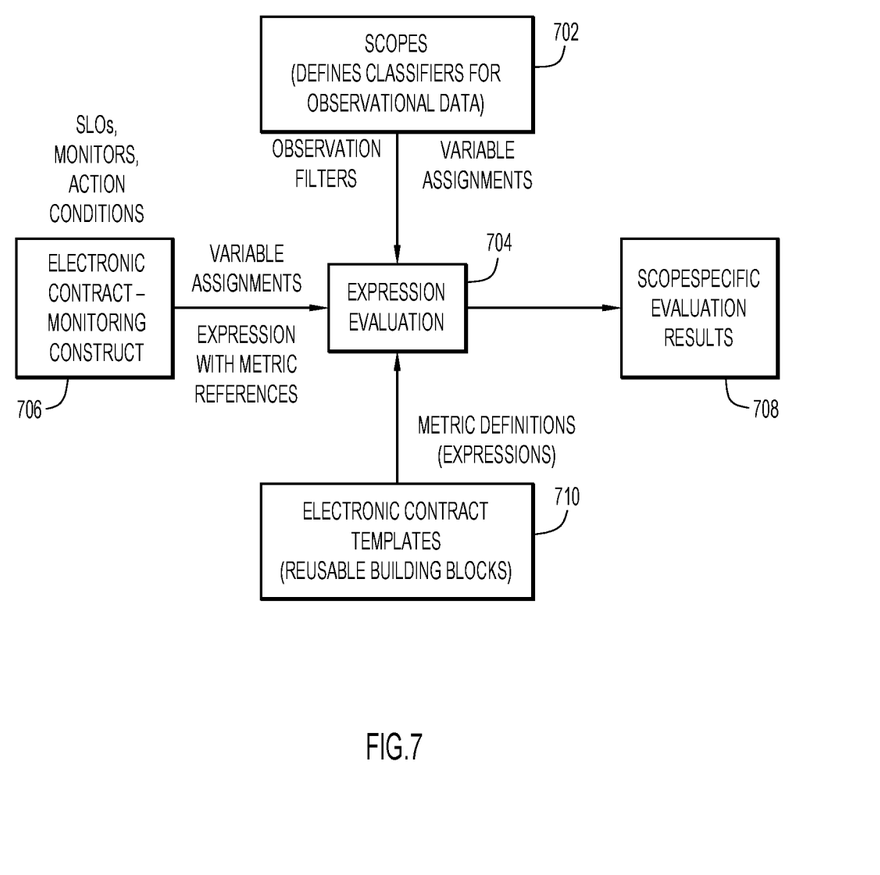
FIG. 7 illustrates example interrelationships among portions of an electronic contract that are related to expression evaluation according to various embodiments.

FIG. 7 illustrates concepts introduced by the examples of FIGS. 3-6. Scopes 702, defined in an electronic contract, may define classifiers for observational data and may define variables and corresponding values assigned thereto. The classifiers may be used as filters for observational data.

Electronic contracts and monitoring constructs 706 may include, but not be limited to, monitoring constructs, SLOs, metric references, and expressions with metric references.

Electronic contract templates 710 are reusable building blocks for specifying electronic contracts and may include metric definitions, which further may include expressions for evaluation.

Expression evaluation 704 may evaluate expressions based on observation data, observation filters, variable assignments, and metric definitions to provide scope-specific evaluation results 708.

Figure 8:
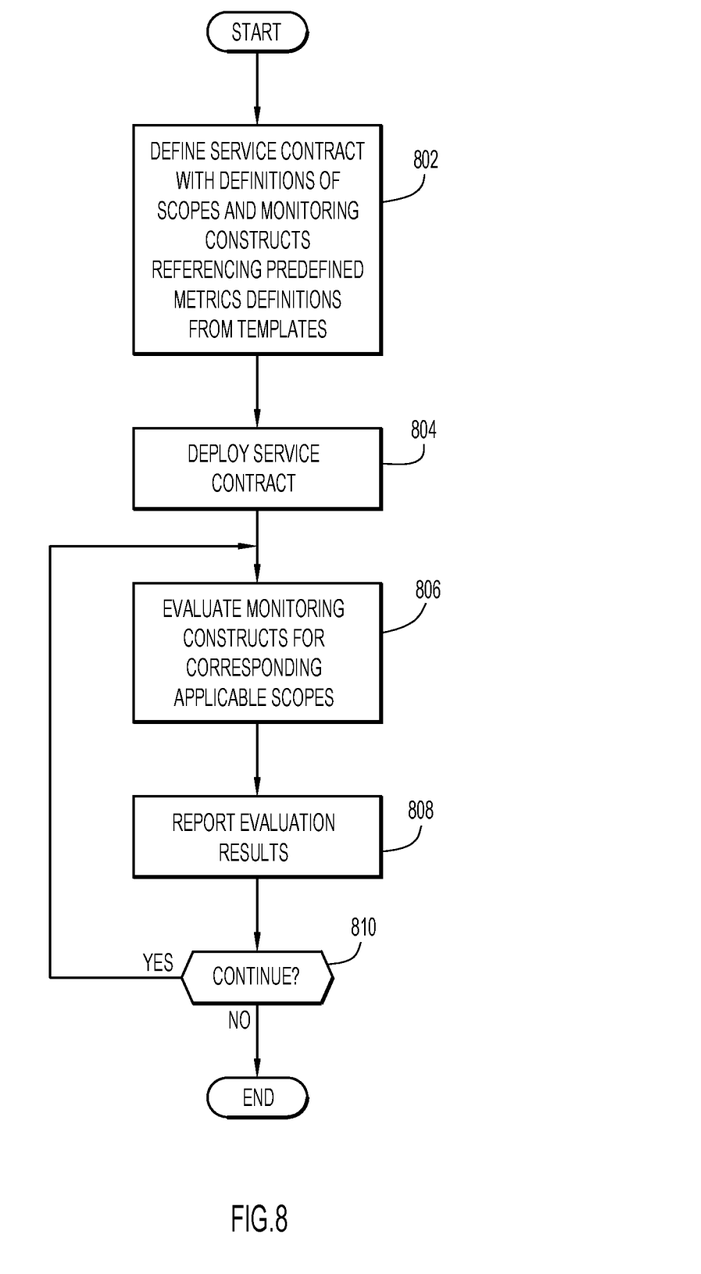
FIG. 8 is a flowchart of an example process for defining and deploying an electronic contract, evaluating monitoring constructs, and reporting evaluation results according to various embodiments.

FIG. 8 is a flowchart illustrating an example process that may be performed in embodiments of the invention. The process may begin with account management defining an electronic contract, which may include, but is not limited to a SLA. The SLA may include definitions of scopes, one or more monitoring constructs, one or more metric references, one or more SLOs, and references to predefined templates, which may further include metric definitions and expressions (act 802). The electronic contract then may be deployed to electronic contract engine 100 (act 804).

Electronic contract engine 100 may evaluate monitoring constructs for corresponding applicable scopes with respect to, for example, performance data recorded in internal database 108 (act 806). Evaluation results may be recorded in, for example, external database 110, which may be analyzed by, for example, BI analytics 112 (act 808).

Electronic contract engine 100 then may determine whether monitoring is to continue (act 810). If monitoring is to continue, acts 706-710 may again be performed. Otherwise, the process may be completed.

It will be appreciated that the embodiments described above and illustrated in the drawings represent only a few of the many ways of implementing various embodiments.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, microphone, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for enforcing electronic contracts between computing devices, the computer-implemented method comprising:
    retrieving, by a computer, a first construct and a second construct for an electronic contract between computing devices of a service provider and a service consumer, wherein the first construct includes a predefined reusable template of metric definitions common to a plurality of different electronic contracts, and wherein the second construct is specific to the service consumer and includes a set of classifiers each indicating a corresponding class for a task and including a selector pattern identifying the corresponding class and a set of variable declarations for the corresponding class;
    applying, by the computer, the set of classifiers of the second construct to the metric definitions of the first construct;
    filtering, by the computer, performance data of the service provider computing device according to the selector pattern of the each classifier to identify performance data associated with each corresponding class, wherein the performance data is collected based on the metric definitions;
    evaluating for each corresponding class, by the computer, one or more algebraic expressions of the metric definitions in accordance with the each classifier and the filtered performance data associated with the corresponding class to determine compliance of the service provider computing device with the electronic contract, wherein the electronic contract specifies different requirements for the performance data for at least two different corresponding classes of tasks; and
    capturing and reporting, by the computer, results of the evaluating indicating whether the service provider computing device is in compliance with the electronic contract.

2. The computer-implemented method of claim 1, further comprising:
    retrieving the one or more algebraic expressions from the first construct.

3. The computer-implemented method of claim 1, wherein:
    the electronic contract includes a specific service level agreement document for a specific service consumer, and
    the specific service level agreement document includes the second construct with classifier definitions defining the classifiers for the specific service consumer.

4. The computer-implemented method of claim 3, wherein:
    each of the classifier definitions includes at least one variable declaration corresponding to a variable included in at least some of the metric definitions.

5. The computer-implemented method of claim 3, wherein:
    the specific service level agreement document includes a definition for a monitor task to monitor and record metrics.

6. The computer-implemented method of claim 5, wherein:
    the definition of the monitor task includes at least one name of at least one of the metrics having values to be evaluated and recorded, and
    the values of the at least one of the metrics are evaluated according to a set of variable declarations for the classifiers and evaluated expressions included in the first construct, at least some of the evaluated expressions including a respective variable having a corresponding variable declaration in the set of variable declarations for the classifiers.

7. A computer system for enforcing electronic contracts between computing devices, the computer system comprising:
    at least one computing device, each of which comprises:
        at least one processor, and
        at least one memory connected to the at least one processor;
        wherein the at least one processor is configured to perform:
            retrieving a first construct and a second construct for an electronic contract between computing devices of a service provider and a service consumer, wherein the first construct includes a predefined reusable template of metric definitions common to a plurality of different electronic contracts, and wherein the second construct is specific to the service consumer and includes a set of classifiers each indicating a corresponding class for a task and including a selector pattern identifying the corresponding class and a set of variable declarations for the corresponding class;

applying the set of classifiers of the second construct to the metric definitions of the first construct;

filtering performance data of the service provider computing device according to the selector pattern of the each classifier to identify performance data associated with each corresponding class, wherein the performance data is collected based on the metric definitions;

evaluating for each corresponding class one or more algebraic expressions of the metric definitions in accordance with the each classifier and the filtered performance data associated with the corresponding class to determine compliance of the service provider computing device with the electronic contract, wherein the electronic contract specifies different requirements for the performance data for at least two different corresponding classes of tasks; and capturing and reporting results of the evaluating indicating whether the service provider computing device is in compliance with the electronic contract.

8. The computer system of claim 7, wherein the at least one processor is further configured to perform:

retrieving the one or more algebraic expressions from the first construct.

9. The computer system of claim 7, wherein:

the electronic contract includes a specific service level agreement document for a specific service consumer, and the specific service level agreement document includes the second construct with classifier definitions defining the classifiers for the specific service consumer.

10. The computer system of claim 9, wherein:

each of the classifier definitions includes at least one variable declaration corresponding to a variable included in at least some of the metric definitions.

11. The computer system of claim 9, wherein:

the specific service level agreement document includes a definition for a monitor task to monitor and record metrics.

12. The computer system of claim 11, wherein:

the definition of the monitor task includes at least one name of at least one of the metrics having values to be evaluated and recorded, and the values of the at least one of the metrics are evaluated according to a set of variable declarations for the classifiers and evaluated expressions included in the first construct, at least some of the evaluated expressions including a respective variable having a corresponding variable declaration in the set of variable declarations for the classifiers.

13. A computer program product for enforcing electronic contracts between computing devices, the computer program product comprising at least one computer readable storage medium having computer readable program code embodied therewith for execution on at least one processor of a computer system, the computer readable program code being configured to be executed by the at least one processor to perform:

retrieving a first construct and a second construct for an electronic contract between computing devices of a service provider and a service consumer, wherein the first construct includes a predefined reusable template of metric definitions common to a plurality of different electronic contracts, and wherein the second construct is specific to the service consumer and includes a set of classifiers each indicating a corresponding class for a task and including a selector pattern identifying the corresponding class and a set of variable declarations for the corresponding class;

applying the set of classifiers of the second construct to the metric definitions of the first construct;

filtering performance data of the service provider computing device according to the selector pattern of the each classifier to identify performance data associated with each corresponding class, wherein the performance data is collected based on the metric definitions;

evaluating for each corresponding class one or more algebraic expressions of the metric definitions in accordance with the each classifier and the filtered performance data associated with the corresponding class to determine compliance of the service provider computing device with the electronic contract, wherein the electronic contract specifies different requirements for the performance data for at least two different corresponding classes of tasks; and capturing and reporting results of the evaluating indicating whether the service provider computing device is in compliance with the electronic contract.

14. The computer program product of claim 13, wherein the computer readable program code is further configured to be executed by the at least one processor to perform:

retrieving the one or more algebraic expressions from the first construct.

15. The computer program product of claim 13, wherein:

the electronic contract includes a specific service level agreement document for a specific service consumer, and the specific service level agreement document includes the second construct with classifier definitions defining the classifiers for the specific service consumer.

16. The computer program product of claim 15, wherein:

each of the classifier definitions includes at least one variable declaration corresponding to a variable included in at least some of the metric definitions.

17. The computer program product of claim 15, wherein:

the specific service level agreement document includes a definition for a monitor task to monitor and record metrics.

18. The computer program product of claim 17, wherein:

the definition of the monitor task includes at least one name of at least one of the metrics having values to be evaluated and recorded, and the values of the at least one of the metrics are evaluated according to a set of variable declarations for the classifiers and evaluated expressions included in the first construct, at least some of the evaluated expressions including a respective variable having a corresponding variable declaration in the set of variable declarations for the classifiers.

\* \* \* \* \*